United States Patent
Zou et al.

(10) Patent No.: US 11,862,973 B2
(45) Date of Patent: Jan. 2, 2024

(54) OPTIMIZATION METHOD FOR CAPACITY OF HEAT PUMP AND POWER OF VARIOUS SETS OF ENERGY SOURCE EQUIPMENT IN ENERGY HUB

(71) Applicant: XIANGTAN UNIVERSITY, Xiangtan (CN)

(72) Inventors: Juan Zou, Xiangtan (CN); Xu Yang, Xiangtan (CN); Tingrui Pei, Xiangtan (CN); Jinhua Zheng, Xiangtan (CN); Zhongbing Liu, Xiangtan (CN)

(73) Assignee: XIANGTAN UNIVERSITY, Xiangtan (CN)

( * ) Notice: Subject to any disclaimer, the term of this patent is extended or adjusted under 35 U.S.C. 154(b) by 343 days.

(21) Appl. No.: 17/333,510

(22) Filed: May 28, 2021

(65) Prior Publication Data
US 2021/0376605 A1  Dec. 2, 2021

(30) Foreign Application Priority Data
May 28, 2020 (CN) .......................... 202010471573.8

(51) Int. Cl.
*H02J 3/00* (2006.01)
*H02J 3/28* (2006.01)

(52) U.S. Cl.
CPC .............. *H02J 3/003* (2020.01); *H02J 3/004* (2020.01); *H02J 3/28* (2013.01)

(58) Field of Classification Search
CPC ... H02J 3/003; H02J 3/004; H02J 3/28; G06F 2113/08; G06F 30/17; G06F 2119/08; G06F 30/20; G06Q 50/06; G06Q 10/04
See application file for complete search history.

(56) References Cited

FOREIGN PATENT DOCUMENTS

| CN | 103617460 A | * | 3/2014 | |
|---|---|---|---|---|
| CN | 108053069 A | * | 5/2018 | ............ G06Q 10/04 |
| CN | 108646552 A | * | 10/2018 | .......... G05B 13/042 |
| CN | 110333660 A | * | 10/2019 | |
| CN | 110516863 A | * | 11/2019 | |
| CN | 111008760 A | * | 4/2020 | |

* cited by examiner

*Primary Examiner* — Mohammad Ali
*Assistant Examiner* — Dhruvkumar Patel
(74) *Attorney, Agent, or Firm* — Siritzky Law, PLLC (57) ABSTRACT

The present disclosure discloses a method for optimizing equipment capacity and equipment power of an energy hub system. The method includes establishing an energy hub model containing natural gas boilers, electric boilers, coolers and heat pumps, establishing a bilevel optimized upper model to solve the optimal heat pump capacity, and establishing a bilevel optimized lower model to solve the optimal power utilization of each energy device based on the binary search algorithm of the quadratic function solves the upper model by using the multi-objective evolutionary algorithm NSGA-II to solve the lower model. The optimization method of the present invention can solve the multi-objective bilevel model problem without the help of commercial optimization software. Obtaining a reasonable, efficient and green planning scheme makes the total operating cost and total exhaust gas emissions of the energy hub relatively optimal.

9 Claims, 7 Drawing Sheets

OPTIMIZATION METHOD FOR CAPACITY OF HEAT PUMP AND POWER OF VARIOUS SETS OF ENERGY SOURCE EQUIPMENT IN ENERGY HUB

CROSS REFERENCE TO RELATED APPLICATION(S)

This patent application claims the benefit and priority of Chinese Patent Application No. 202010471573.8, filed on May 28, 2020, the disclosure of which is incorporated by reference herein in its entirety as part of the present application.

TECHNICAL FIELD

The present disclosure relates to the field of energy hubs, and in particular, to an optimization method for capacity of a heat pump and power of various sets of energy source equipment in an energy hub.

BACKGROUND ART

Modern society cannot survive and develop without the support of energy sources. With the development and progress of society, the demand for the energy sources is increasing. At present, the main energy source is still traditional fossil energy source. With the occurrences of the problems of deteriorating environment and the like caused by gradual depletion of the traditional fossil energy source and energy consumption, various countries are actively studying renewable energy sources and energy source recovery technologies, so the use of multi-energy source systems will increase day by day. Energy hubs are important parts of the multi-energy source systems, which can accommodate the input of various forms of energy sources and diversified load types. Optimized configuration of equipment types and capacity of the energy hubs is the foundation for ensuring safe and economic operation of the energy hubs. The multi-energy source systems are modeled by using the energy hubs, which realizes collaborative optimization of various forms of energy sources. Mutual aid and complementation of various forms of energy sources will be taken into full consideration, so as to achieve a plurality of direct collaborative effects. In view of optimization, the essence for realizing comprehensive optimization of the multi-energy system is to transform a discrete subspace optimization problem into a larger full-space optimization problem.

Adding waste heat recovery technologies to an energy hub is helpful to reduce the operation cost and the emission of greenhouse gases. Introducing a cold and hot interconnection mechanism of a heat pump into the energy hub can recover heat from a cooling loop and provide the heat to a heating loop. There are multiple sets of energy supply equipment in the energy hub, including a natural gas boiler, an electric boiler, a cooler, and the heat pump, and the cooling and heating load provided by these sets of equipment need to satisfy the output of the cooling and heating load. Optimizing the capacity of equipment and the power of various sets of the energy source equipment in the energy hub on the premise of satisfying the needs of the cooling and heating load and a variety of constraints is a problem to be optimized by the present disclosure. The problem has non-linear stochastic characteristics, which brings great difficulties to optimization. At present, there are very few studies with regard to this problem. Usually, mathematical analysis needs to be performed to linearize a nonlinear problem, then a dual model is solved, and finally, a commercial optimizer, for example, cplex and gurobi, is used for solving. With regard to the above-mentioned problem, the present disclosure provides an optimization method for capacity of a heat pump and power of various sets of energy source equipment in an energy hub, which can directly optimize an original model without performing much processing on a problem model. The optimization algorithms used in the present disclosure include a quadratic function-based binary search algorithm and a multi-objective evolutionary algorithm NSGA-II.

SUMMARY

The objective of the present disclosure is to solve the problem about configuration of capacity of a heat pump and operating power of various sets of energy source equipment in an energy hub, which can realize efficient, economic, and green operation of the energy hub. In order to achieve the above-mentioned objective, the present disclosure provides an optimization method for capacity of a heat pump and power of various sets of energy source equipment in an energy hub, including the following steps:

(1) establishing an energy hub model containing a natural gas boiler, an electric boiler, a cooler, and a heat pump;

(2) establishing an upper-layer model of double-layer optimization to solve optimal capacity of the heat pump;

(3) establishing a lower-layer model of double-layer optimization to solve optimal power of the various sets of energy source equipment;

(4) solving the upper-layer model by using a quadratic function-based binary search algorithm;

(5) solving a lower-layer model by using a multi-objective evolutionary algorithm NSGA-II;

(6) integrating double layers of optimization models to obtain an optimal solution.

Optionally, the energy source equipment includes a natural gas boiler, an electric boiler, a cooler, and a heat pump.

Optionally, the step (1) specifically includes:

establishing an energy source supply network according to energy supply equipment in the energy hub, where the input of the energy hub includes electric energy and natural gas; and the input of the energy hub includes heating load, cooling load, and additional electrical load.

Optionally, the step (2) specifically includes that:

In the energy hub, the power of various sets of equipment can be optimized only after the capacity of the various sets of equipment is set, which is obviously a problem about master-slave optimization. The double layers of optimization models are commonly used models for solving the master-slave optimization problem.

The first objective function of the upper-layer model is to minimize the total annual cost $C_{to}$ of an energy hub system:

$$\min C_{tot} = C_{init}^{HP} + \frac{(1+i)^n - 1}{i(1+i)^n} C_{op} \quad (1)$$

$$C_{init}^{HP} = \varphi_{HP} Q_{HP,max} \quad (2)$$

Where, $C_{init}^{HP}$ is the initial cost of the heat pump, n is the operating years of the energy hub, i is the operation and maintenance growth rate of the energy hub, $C_{op}$ is the annual operation cost and is provided by the lower-layer model, $\varphi_{HP}$ is the price per unit heat pump capacity, and $Q_{HP,max}$ is the capacity of the heat pump.

The second objective function of the upper-layer model is to minimize the total annual exhaust emission $CO_{2,tot}$ of the energy hub system:

$$\min CO_{2,tot}=CO_{2,e}+CO_{2,f} \quad (3)$$

Where, $CO_{2,e}$ is the exhaust emission of an electrical device, $CO_{2,f}$ is the exhaust emission of a natural gas device, and $CO_{2,tot}$ is provided by the lower-layer model.

The heat pump capacity constraint of the upper-layer model is:

$$0 \leq Q_{HP,max} \leq Q\_max_{HP,max} \quad (4)$$

Where, $Q\_max_{HP,max}$ is the theoretical maximum capacity of the heat pump, i.e., the desirable upper limit when optimizing the capacity of the heat pump, and is provided by the lower-layer model.

Optionally, the step (3) specifically includes that:
In the double-layer optimization, the upper layer mainly optimizes the capacity of the heat pump, and the lower layer mainly optimizes the power of various sets of equipment.

The first objective function of the lower-layer model is to minimize the total annual operation cost $C_{op}$ of the energy hub system:

$$\min C_{op} = C_{op,e} + C_{op,f} \quad (5)$$

$$\min C_{op,e} = \begin{cases} \varphi_{e,night} \sum_{t=1}^{N} P_e(t) \Delta t, t \in [19, 24) \\ \varphi_{e,day} \sum_{t=1}^{N} P_e(t) \Delta t, t \in [0, 19) \end{cases} \quad (6)$$

$$C_{op,f} = \varphi_f \sum_{t=1}^{N} P_f(t) \Delta t \quad (7)$$

$$P_e = P_{e,EH} + P_{e,HP} + P_{e,CH} + L_e \quad (8)$$

Where, $C_{op,e}$ is the total annual operation cost of electricity, $C_{op,f}$ is the total annual operation cost of natural gas, $\varphi_f$ is the price per unit natural gas, $\varphi_{e,night}$ is the price per kilowatt-hour in an off-peak period of electricity consumption [19:00 to 24:00], $\varphi_{e,day}$ is the price per kilowatt-hour in a peak period of electricity consumption [00:00 to 19:00], $P_f(t)$ is the total power of natural gas equipment at time t, $P_e(t)$ is the total power of electrical equipment at time t, $\Delta t=1$ is unit time, N=8760 is the total times of a year, $P_e$ is the total electric power, $P_{e,EH}$ is the power of the electric boiler, $P_{e,HP}$ is the power of the heat pump, $P_{e,CH}$ is the power of a refrigerator, and $L_e$ is additional electric power of a user.

The second objective function of the lower-layer model is to minimize the total annual exhaust emission $CO_{2,tot}$ of the energy hub system:

$$\min CO_{2,tot}=CO_{2,e}+CO_{2,f} \quad (9)$$

$$CO_{2,e}=\lambda_e \sum_{t=1}^{N} P_e(t) \Delta t \quad (10)$$

$$CO_{2,f}=\lambda_f \sum_{t=1}^{N} P_f(t) \Delta t \quad (11)$$

Where, the $CO_{2,e}$ is the total annual exhaust emission of electricity, $CO_{2,f}$ is the total annual exhaust emission of natural gas, $\lambda_e$ is the exhaust emission per unit electric power, and $\lambda_f$ is the exhaust emission per unit natural gas.

The load balance constraint of the lower-layer model is:

$$\text{original constraint: st.} \begin{cases} L_h = \eta_{fh}^B P_f + \eta_{eh}^{EH} P_{e,EH} + \eta_{eh}^{HP} P_{e,HP} & (12) \\ L_c = \eta_{ec}^{CH} P_{e,CH} + (\eta_{ch}^{HP} - 1) P_{e,HP} & (13) \end{cases}$$

$$\text{loose constraint: st.} \begin{cases} L_h \leq \eta_{fh}^B P_f + \eta_{eh}^{EH} P_{e,EH} + \eta_{eh}^{HP} P_{e,HP} & (16) \\ L_c \leq \eta_{ec}^{CH} P_{e,CH} + (\eta_{ch}^{HP} - 1) P_{e,HP} & (17) \end{cases}$$

loss $$\text{function}: CV. \begin{cases} g_1 = \max(0, 1 - (\eta_{fh}^B P_f + \eta_{eh}^{EH} P_{e,EH} + \eta_{eh}^{HP} P_{e,HP})/L_h) & (18) \\ g_2 = \max(0, 1 - (\eta_{ec}^{CH} P_{e,CH} + (\eta_{ch}^{HP} - 1) P_{e,HP})/L_c) & (19) \end{cases}$$

$$\begin{cases} L_h = A_h + A_h \sin\left(2\pi \frac{t}{\tau_y} + \frac{\pi}{2}\right) & (20) \\ L_c = A_c + A_c \sin\left(2\pi \frac{t}{\tau_y} - \frac{\pi}{2}\right) & (21) \end{cases}$$

Where, $A_h$ is the amplitude of a heating load function, and $A_c$ is the amplitude of a cooling load function.

Where, $L_h$ is total heating load, $L_c$ is total cooling load, $\eta_{fh}^B$ is a heating coefficient of the natural gas boiler, which represents the heating capacity per unit natural gas in the natural gas boiler, $\eta_{eh}^{EH}$ is a heating coefficient of the electric boiler, which represents the heating capacity per kilowatt-hour electricity in the electric boiler, $\eta_{eh}^{HP}$ is a heating coefficient of the heat pump, which represents the heating capacity per kilowatt-hour electricity in the heat pump, and $\eta_{ec}^{CH}$ is a refrigerating coefficient of the refrigerator, which represents the refrigerating capacity per kilowatt-hour electricity in the refrigerator.

The energy source equipment operation constraint of the lower-layer model is:

$$\text{st.} \begin{cases} P_{e,CH} \geq 0 & (22) \\ P_{e,HP} \geq 0 & (23) \\ P_{e,EH} \geq 0 & (24) \\ P_f \geq 0 & (25) \end{cases}$$

$$\text{st.} \begin{cases} \eta_{ec}^{CH} P_{e,CH} \leq Q_{CH,max} & (26) \\ (\eta_{eh}^{HP} - 1) P_{e,HP} \leq Q_{HP,max} & (27) \\ \eta_{eh}^{EH} P_{e,EH} \leq Q_{EH,max} & (28) \\ \eta_{fh}^B P_f \leq Q_{B,max} & (29) \end{cases}$$

loss function: $g_3 = \max(0, 1-Q_{HP,max}/(\eta_{eh}^{HP}-1)P_{e,HP})$ (30)

$$P_{e,HP}(t) \leq \min\left\{\frac{L_c(t)}{\eta_{eh}^{HP}-1}, \frac{L_h(t)}{\eta_{eh}^{HP}}\right\} \quad (31)$$

Where, $Q_{CH,max} \to \infty$ is the maximum capacity of the refrigerator, $Q_{EH,max}=2000$ is the maximum capacity of the electric boiler, and $Q_{B,max} \to \infty$ is the maximum capacity of the natural gas boiler. Based on the working principle of the heat pump, the heat pump can heat and refrigerate simultaneously, and the heating capacity is equal to the refrigerating capacity, so in order not to waste energy, the maximum power of the heat pump does not exceed $$\min\left\{\frac{L_c(t)}{\eta_{eh}^{HP}-1}, \frac{L_h(t)}{\eta_{eh}^{HP}}\right\}.$$

Optionally, the step (4) specifically includes that:
(4-1) The binary search algorithm is a computer algorithm with the time complexity of O(logn). A lower limit and an upper limit of the capacity of the heat pump need to be set according to the idea of the binary search algorithm. It can be known from the formula (27) that the value range of the capacity of the heat pump is

[lmid, rmid]=[0, $(\eta_{eh}^{HP}-1)P_{e,HP}$].

(4-2) An ending condition of binary search needs to be set according to the idea of a binary algorithm. According to the idea of the multi-objective algorithm, if the length of the value range of the capacity of the heat pump is less than L, then the binary search is ended to enter step (4-7).

(4-3) According to the analysis of a heat pump efficiency graph, large or small heat pump capacity is not beneficial to the operation of the whole energy hub. The heat pump efficiency graph which is a quadratic function with an upward opening is obtained. So, we need to take three values for comparing each time when binary search is performed, respectively:

$$mid=(lmid+rmid)/2 \quad (32)$$

$$lmid=(lmid+mid)/2 \quad (33)$$

$$rmid=(mid+rmid)/2 \quad (34)$$

(4-4) Optimal total annual operation cost $lmid_{C_{op}}$, $mid_{C_{op}}$, and $rmid_{C_{op}}$ and optimal total annual exhaust emission $lmid_{Co2_{tot}}$, $mid_{Co2_{tot}}$, and $rmid_{Co2_{tot}}$ corresponding to the lmid, mid, and rmid are obtained from the lower-layer model, and objective function values, total annual cost $C_{tot}$ and total annual exhaust emission $Co2_{tot}$, are calculated by means of objective function formulae (1) and (3), which are respectively:

$$tuple_{lmid}=(lmid_{C_{tot}}, lmid_{Co2_{tot}}) \quad (35)$$

$$tuple_{mid}=(mid_{C_{op}}, mid_{Co2_{tot}}) \quad (36)$$

$$tuple_{rmid}=(rmid_{C_{op}}, rmid_{Co2_{tot}}) \quad (37)$$

(4-5) If $tuple_{lmid}$ dominates $tuple_{rmid}$, then the heat pump range is updated to be [lmid, mid], and step (4-2) is re-executed. Otherwise, step (4-6) is executed.

(4-6) If $tuple_{rmid}$ dominates $tuple_{lmid}$, then the heat pump range is updated to be [lmid, mid], and step (4-2) is re-executed. Otherwise, the $tuple_{rmid}$ and the $tuple_{lmid}$ do not dominate each other, then step (4-7) is executed.

(4-7) Optimization solutions, $tuple_{lmid}$, $tuple_{mid}$, and $tuple_{rmid}$, are obtained. The optimization solutions are selected and output according to preference.

Optionally, the step (5) specifically includes:

(5-1) Obtaining heat pump capacity, lmid, mid, and rmid, from the upper-layer model; optimizing the capacity of each heat pump by operating the lower-layer model, and transmitting optimized results to the upper-layer model, where t=1 needs to be set every time.

(5-2) Setting algorithm parameters corresponding to time t, and performing gene coding on decision variables, where the used real number encoding manners respectively include: $P_{e,CH}$, $P_{e,HP}$, $P_{e,EH}$, $P_f$.

(5-3) Initializing a population P.

(5-4) Calculating objective function values, operation cost $C_{op,t}$ and exhaust emission $C_{o2,t}$ at time t.

(5-5) Calculating crowding distance between individuals in the population P.

(5-6) Performing selection operation by using a binary tournament selection method.

Where, in the binary tournament selection method, a tournament selection strategy is that two individuals are taken out from a population (put back for sampling), and then a better one is selected to enter an offspring population.

The operation is repeated until a new population scale reaches the original population scale.

(5-7) Performing crossover operation by using a simulated binary crossover operator (SBX). Step (5-7) specifically includes:

$$x_{1,j}^{t+1} = 0.5*[(1+r_j)*x_{1,j}^t + (1-r_j)*x_{2,j}^t] \quad (38)$$

$$x_{2,j}^{t+1} = 0.5*[(1-r_j)*x_{1,j}^t + (1+r_j)*x_{2,j}^t] \quad (39)$$

$$r_j = \begin{cases} (2u_j)^{\frac{1}{\eta+1}} & \text{if } u_j \le 0.5 \\ \frac{1}{2(1-u_j)}^{\frac{1}{\eta+1}} & \text{other situation} \end{cases} \quad (40)$$

Where, $u_j \in U(0,1)$, $\eta=1$ is a distribution index.

(5-8) Performing mutation operation by using a polynomial mutation operator PM. Step (5-8) specifically includes:

$$x_{1,j}^{t+1}=x_{1,j}^t+\Delta_j \quad (41)$$

$$\Delta_j = \begin{cases} (2u_j)^{\frac{1}{\eta+1}}-1 & \text{if } u_j \le 0.5 \\ 1-(2(1-u_j))^{\frac{1}{\eta+1}} & \text{other situations} \end{cases} \quad (42)$$

Where, $u_j \in U(0,1)$, $\eta=1$ is a distribution index.

(5-9) Merging a parent population P and an offspring population Q into a population R; sorting the population R according to a constraint violation degree and a non-dominant relationship; selecting the former N individuals of the ranked population to enter the next generation for evolution, where N is the size of the population. Step (5-9) specifically includes:

$$CV=g_1+g_2+g_3 \quad (43)$$

The constraints (22), (23), (24), (25), (26), (28), and (29) are ensured to be strictly followed during initialization and evolution. Loss functions, $g_1$, $g_2$, and $g_3$, are calculated according to the formulae (18), (19), and (30), and the constraint violation degree is obtained through a formula (43). The individuals with the constraint violation degree of 0 are selected to enter the population P. If the population P is full, then crossover and mutation are started to be selected; otherwise, if the population P is not full, the individuals with low constraint violation degrees are selected. Front individuals in a non-dominated sorting layer are selected when the constraint violation degrees are the same, and the individuals with large crowing distance are selected when non-dominated sorting layers are the same.

(5-10) Determining whether an algorithm ending condition is satisfied, which specifically includes:

storing the solutions at the time t when continuous N generations of objective function values are converged to a small interval or reaches the maximum number of evolutionary iterations, including the objective function values and decision variables:

$C_{op}(t)$, $CO_2(t)$, $P_{e,EH}(t)$, $P_{e,HP}(t)$, $P_{e,CH}(t)$, $P_f(t)$;

executing step (5-11); otherwise, re-executing step (5-4).

(5-11) Determining whether the solutions at k typical times have been solved or not, which specifically includes that:

There are 8760 times in a year, and it can be known from a load function curve that the annual load demands are symmetrical, so the solutions of 4380 times need to be solved. In order to improve the optimization efficiency, the present disclosure only optimizes the solutions of k typical times by using the idea of typical times. If the solutions at the k typical times have been solved, step (5-12) is executed, and otherwise, step (5-2) is re-executed.

(5-12) Approaching the solutions of non-typical times by using a linear fitting method. Step (5-12) specifically includes that:

There are many linear fitting methods, where a Lagrange interpolation method and a cubic spline curve are commonly used. The present disclosure approaches the solutions of non-typical times by using the Lagrange interpolation method. Lagrange interpolation is performed between every two typical times to obtain the solutions of all non-typical times. Finally, the solutions of the typical times and the non-typical times are merged.

(5-13) Calculating optimal total annual operation cost $C_{op}$ and optimal total annual exhaust emission $CO_{2,tot}$.

$$C_{op}=k*\Sigma C_{op,t}=k*(\varphi_f P_f(t)+\varphi_{e,energy} P_e(t)) \quad (44)$$

is obtained according to the formulae (5), (6), (7), and (8).

$$CO_{2,tot}=k*\Sigma(\pi_e P_e(t)+\lambda_f P_f(t)) \quad (45)$$

$$P_e(t)=(P_{e,EH}(t)+P_{e,HP}(t)+P_{e,CH}(t)+L_e) \quad (46)$$

are obtained according to the formulae (9), (10), and (11).

(5-14) Obtaining operation plans, optimal total annual operation cost, $lmid_{C_{op}}$, $mid_{C_{op}}$, and $rmid_{C_{op}}$, and optimal total annual exhaust emission $lmid_{Co2_{tot}}$, $mid_{Co2_{tot}}$, and $rmid_{Co2_{tot}}$ of various sets of energy source equipment in the energy hub corresponding to lmid, mid, and rmid according to the statistics of the power information, and $C_{op}$ and $CO_{2,tot}$ of various sets of energy source equipment of all times, and transmitting the information to the upper-layer model as parameters for subsequent optimization.

Optionally, step (6) specifically includes:

The integrating double layers of optimization models is to transmit the solutions optimized by the lower-layer model to the upper-layer model, and parameters need to be obtained from the lower-layer model continually when the upper-layer model is optimized. The optimal solutions obtained after the optimization of the upper-layer model is ended are the optimal solutions of problems.

According to the specific embodiments provided by the present disclosure, the present disclosure discloses the following technical effects:

The present disclosure provides an optimization method for capacity of a heat pump and power of various sets of energy source equipment in an energy hub, which establishes a double-layer optimization model with regard to the problem of the energy hub. The upper layer uses an improved binary search algorithm, and the lower layer uses an improved multi-objective evolutionary algorithm NSGA-II. Two layers of models are optimized independently, and finally, the two layers of models are integrated to obtain optimal solutions. The optimization method avoids complicated analysis of a mathematical model, and directly optimizes the original problems without the help of a commercial optimizer.

BRIEF DESCRIPTION OF THE DRAWINGS

To describe the technical solutions in the embodiments of the present disclosure or in the prior art more clearly, the following briefly describes the accompanying drawings required for describing the embodiments. Apparently, the accompanying drawings in the following description show merely some embodiments of the present disclosure, and those of ordinary skill in the art may still derive other drawings from these accompanying drawings without creative efforts.

DETAILED DESCRIPTION OF THE EMBODIMENTS

The technical solutions in the embodiments of the present disclosure will be clearly and completely described herein below with reference to the accompanying drawings in the embodiments of the present disclosure. Apparently, the described embodiments are merely part rather than all of the embodiments of the present disclosure. On the basis of the embodiments of the present disclosure, all other embodiments obtained by those of ordinary skill in the art without creative work fall within the protection scope of the present disclosure.

With regard to the above-mentioned problem, the present disclosure provides an optimization method for capacity of a heat pump and power of various sets of energy source equipment in an energy hub, which can directly optimize an original model without performing much processing on a problem model.

In order to make the above objective, features, and advantages of the present disclosure more apparent and more comprehensible, the present disclosure is further described in detail below with reference to the accompanying drawings and specific implementation manners.

Figure 1:
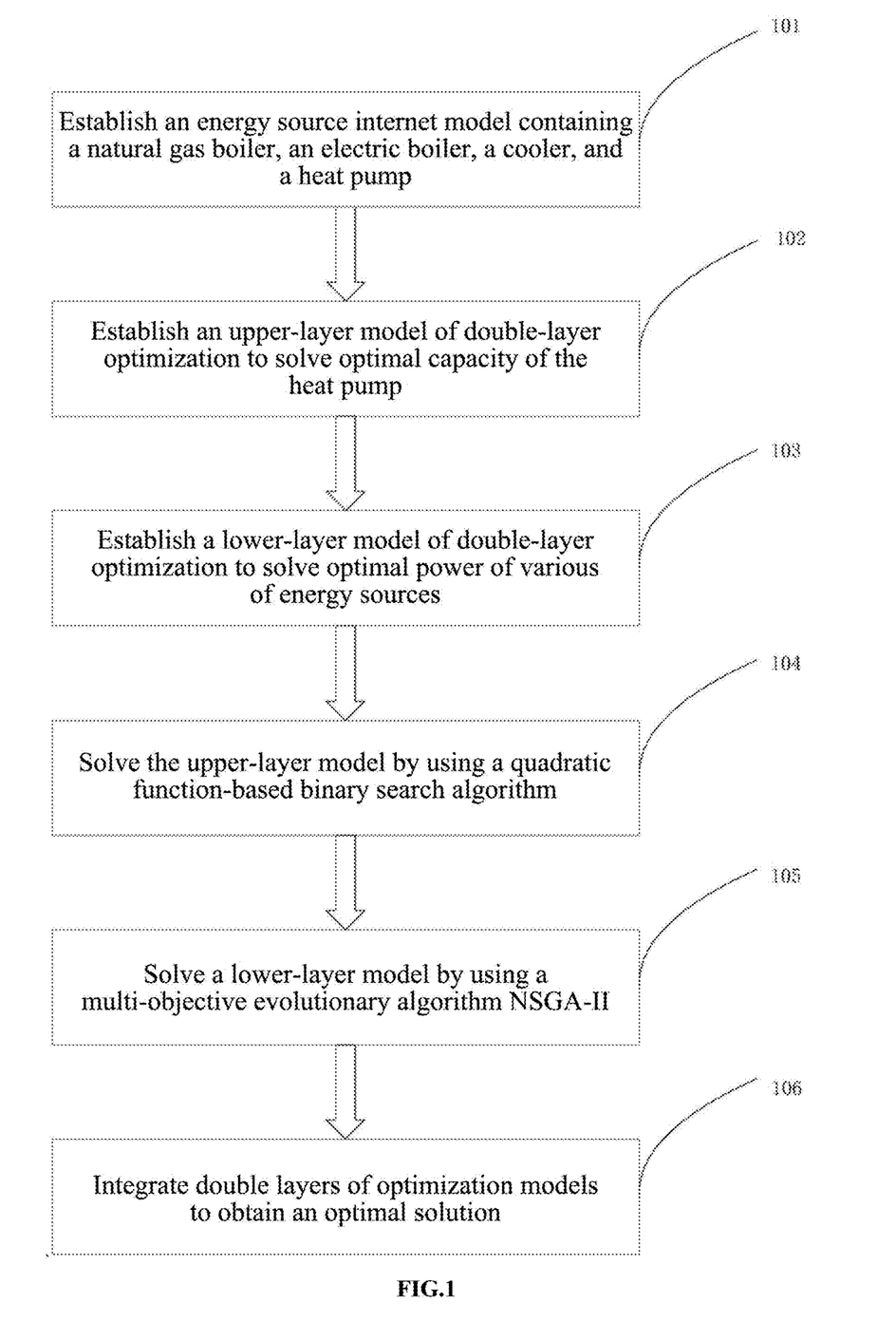
FIG. 1 is a frame diagram of an optimization method for capacity of a heat pump and power of various sets of energy source equipment in an energy hub of embodiments of the present disclosure.
Figure 2:
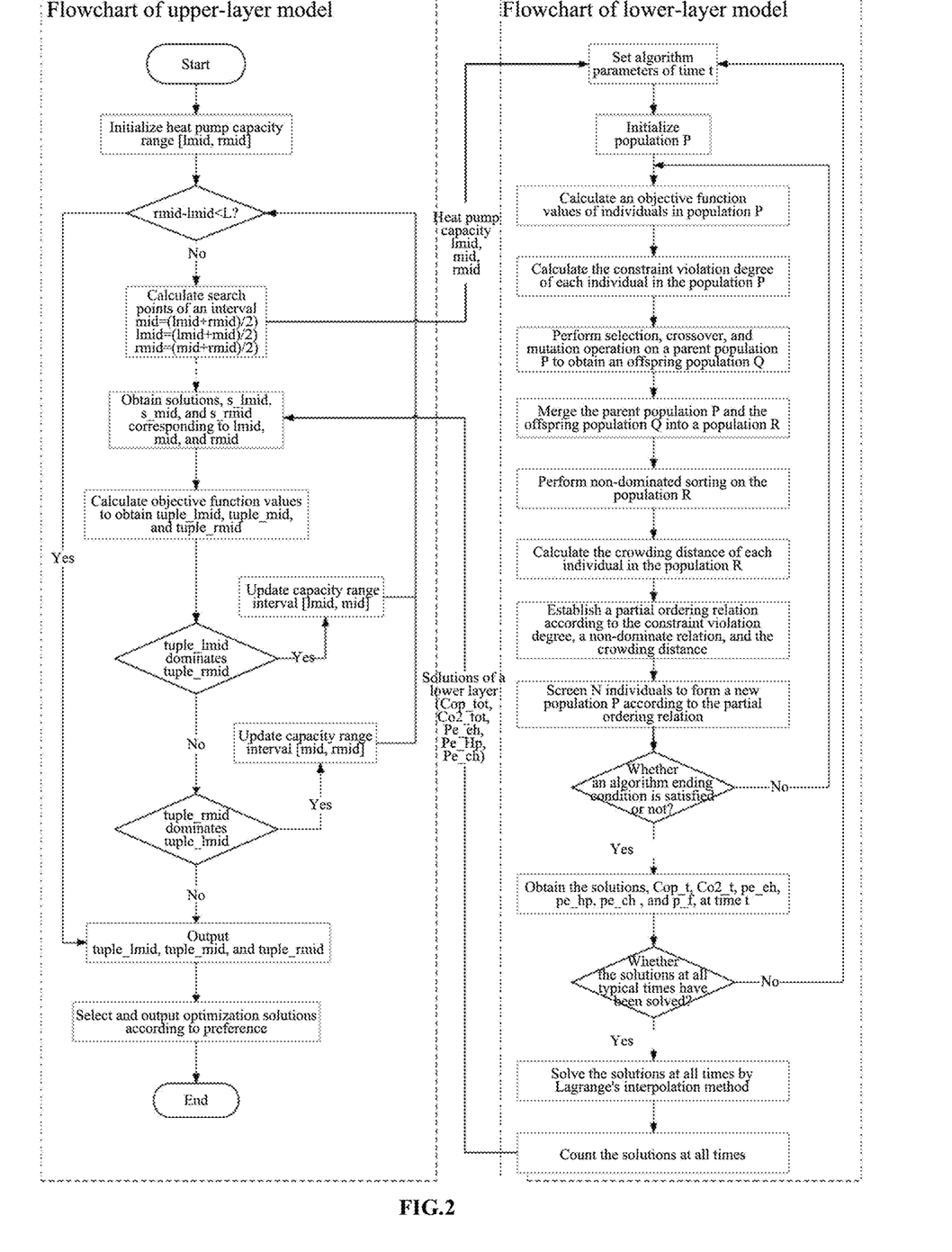
FIG. 2 is a flowchart of the optimization method for capacity of a heat pump and power of various sets of energy source equipment in an energy hub of the embodiments of the present disclosure.
Figure 3:
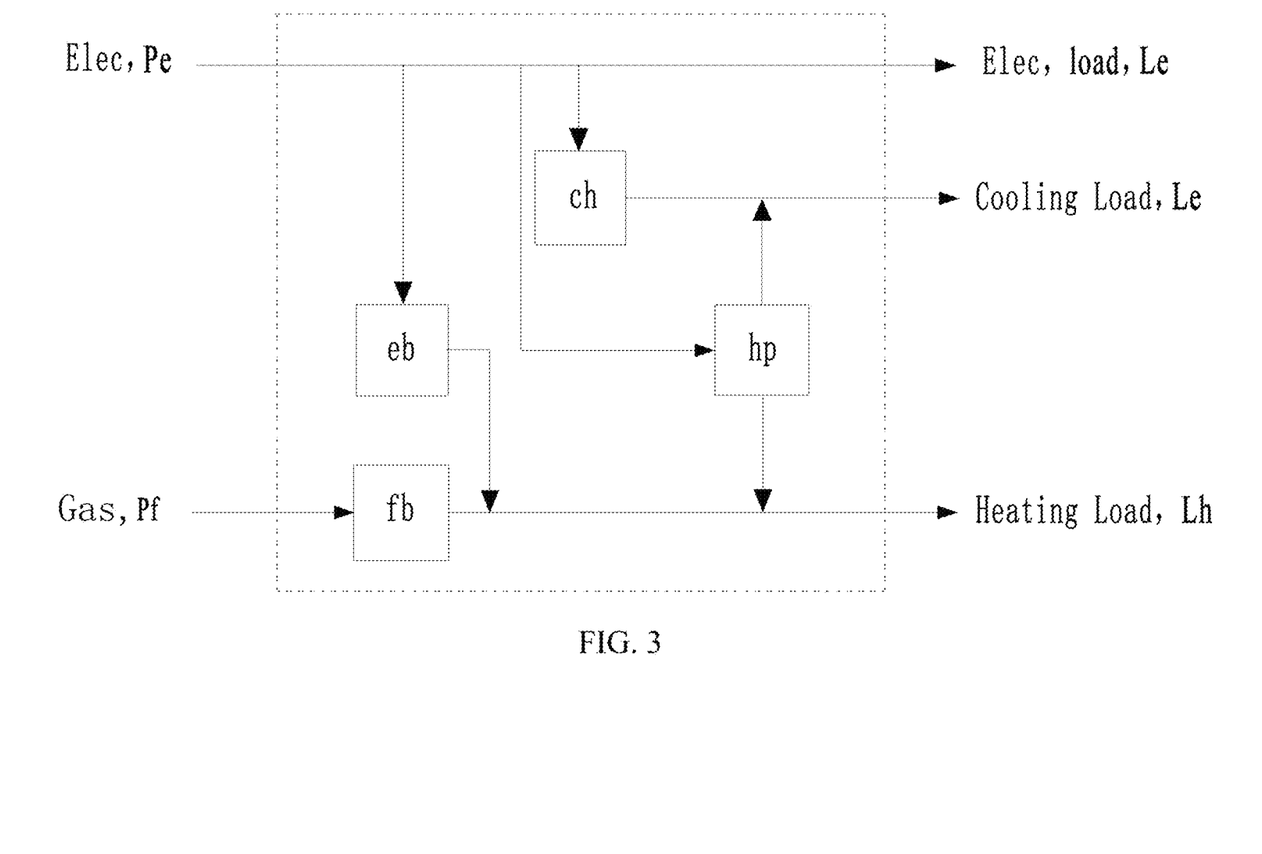
FIG. 3 is a model diagram of an energy hub of the embodiments of the present disclosure.
Figure 4:
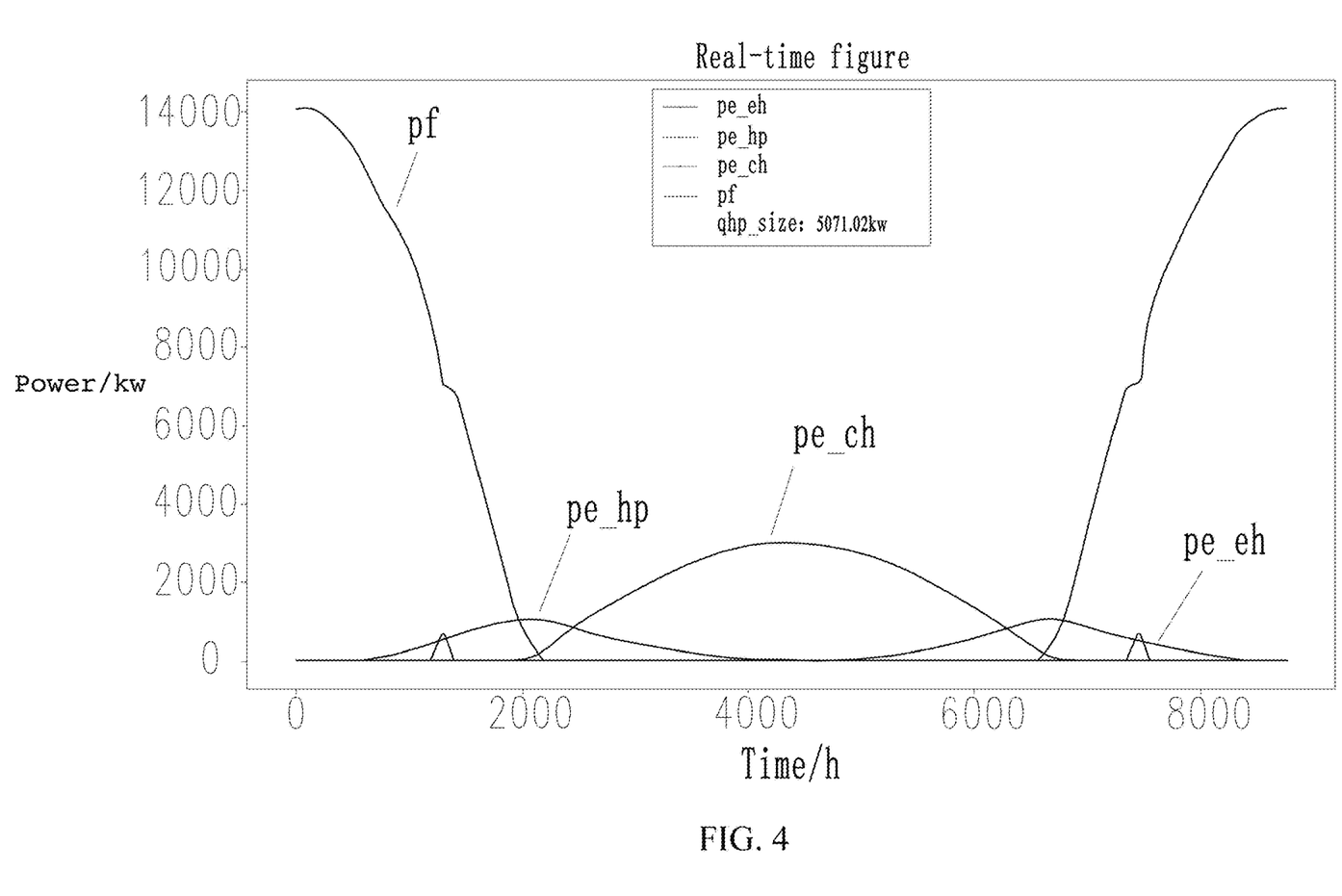
FIG. 4 is a diagram of capacity configuration of a heat pump and real-time operating power of various sets of equipment under the demand of preferring the first objective (desiring less cost) of the embodiments of the present disclosure.
Figure 5:
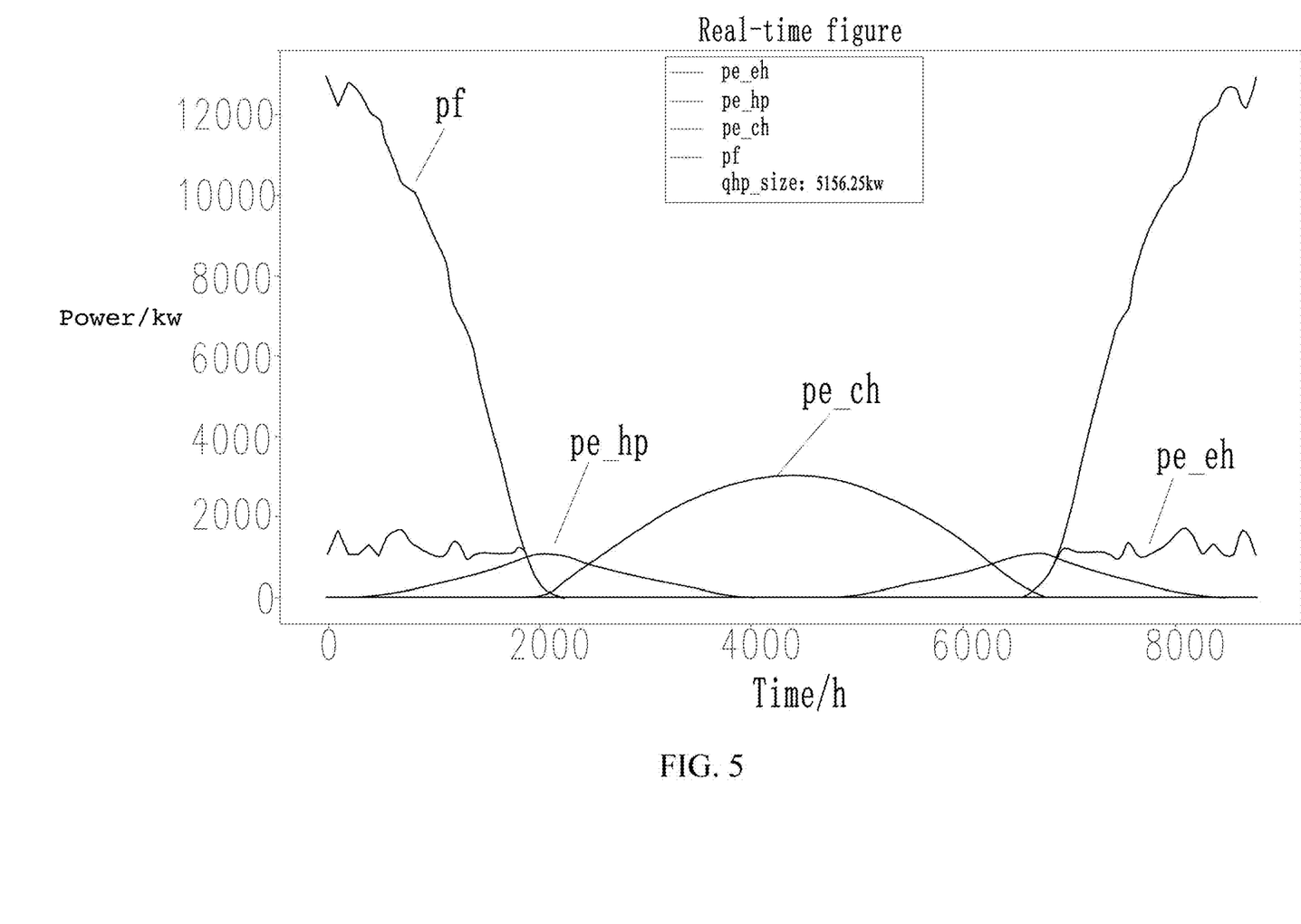
FIG. 5 is a diagram of capacity configuration of a heat pump and real-time operating power of various sets of equipment in absence of preference of the embodiments of the present disclosure.
Figure 6:
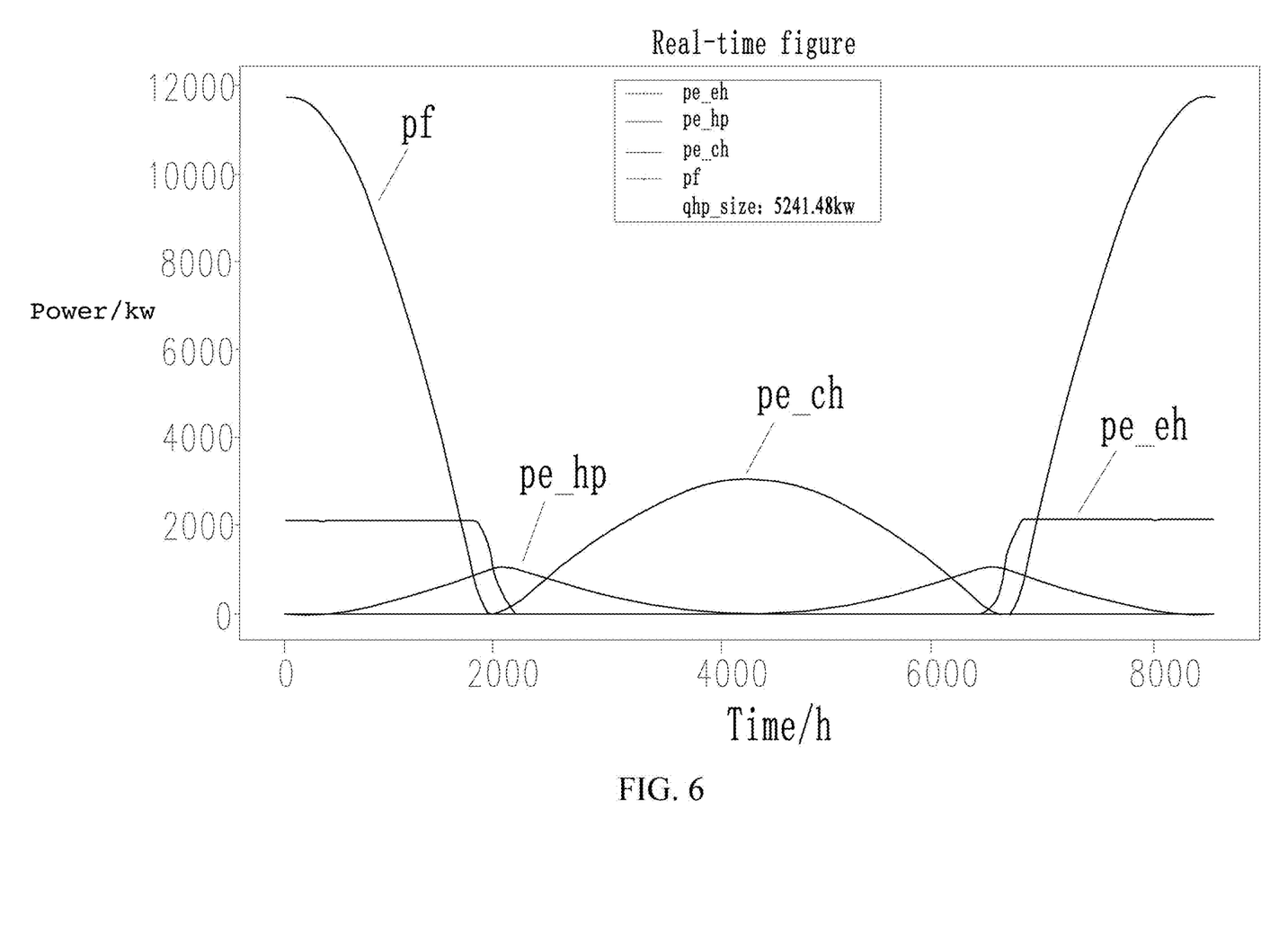
FIG. 6 is a diagram of heat pump capacity configuration and real-time operating power of various sets of equipment under the demand of preferring the second objective (desiring less emission) of the embodiments of the present disclosure.
Figure 7:
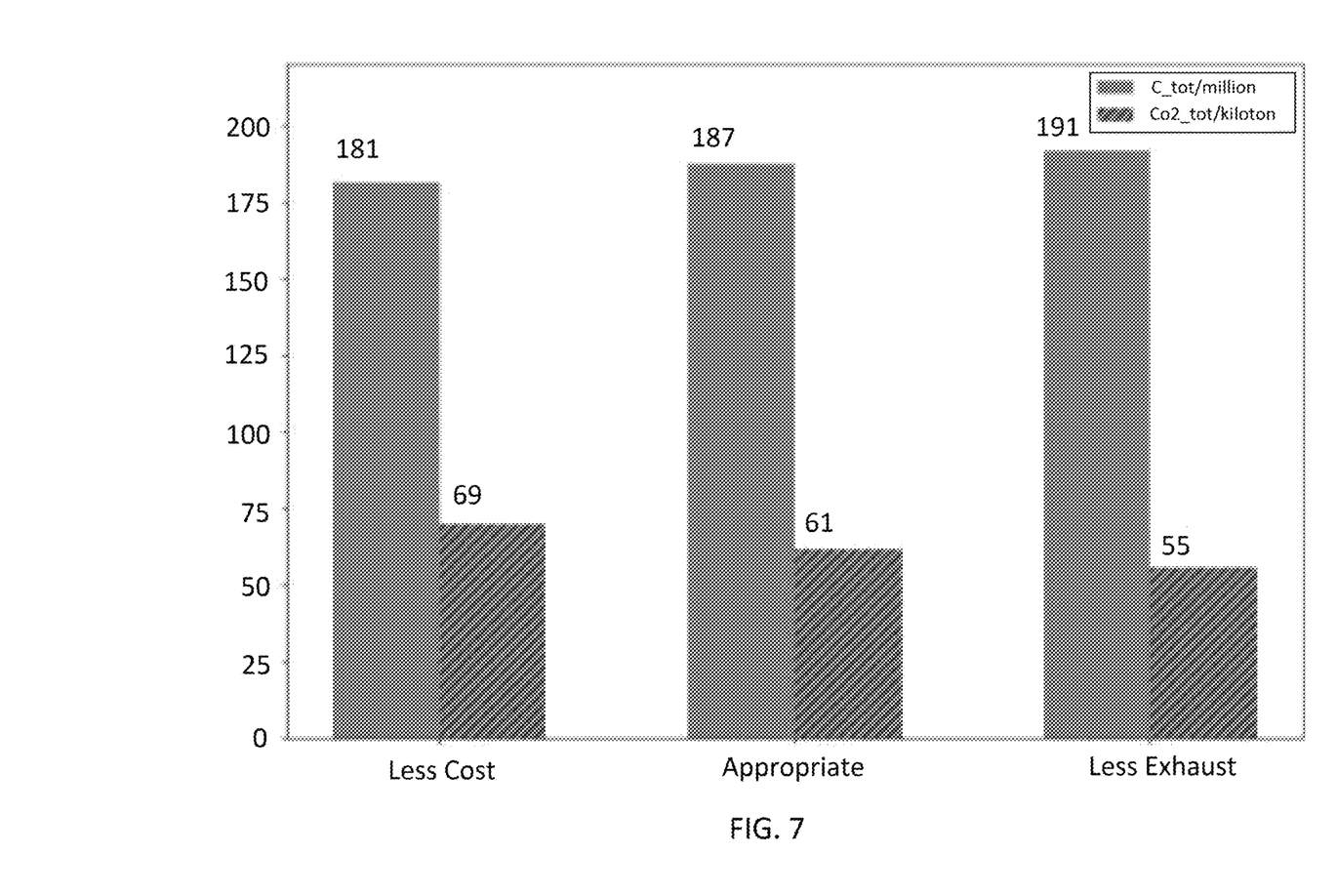
FIG. 7 is a comparison diagram of total annual cost and annual emission of the energy hub under different demands of the embodiments of the present disclosure.

Embodiment 1:

FIG. 2 is a flowchart of an optimization method for capacity of a heat pump and power of various sets of energy source equipment in an energy hub of the embodiments of the present disclosure. The method includes:

(1) establishing an energy hub model containing a natural gas boiler, an electric boiler, a cooler, and a heat pump;

(2) establishing an upper-layer model of double-layer optimization to solve optimal capacity of the heat pump;

(3) establishing a lower-layer model of double-layer optimization to solve optimal power of the various sets of energy source equipment;

(4) solving the upper-layer model by using a quadratic function-based binary search algorithm;

(5) solving a lower-layer model by using a multi-objective evolutionary algorithm NSGA-II;

(6) integrating double layers of optimization models to obtain an optimal solution.

Optionally, the energy source equipment includes a natural gas boiler, an electric boiler, a cooler, and a heat pump.

Optionally, the step (1) specifically includes:

An energy source supply network is established according to energy supply equipment in the energy hub, where the input of the energy hub includes electric energy and natural gas; and the input of the energy hub includes heating load, cooling load, and additional electrical load.

Optionally, the step (2) specifically includes that:

In the energy hub, the power of various sets of equipment can be optimized only after the capacity of the various sets of equipment is set, which is obviously a problem about master-slave optimization. The double layers of optimization models are commonly used models for solving the master-slave optimization problem.

The first objective function of the upper-layer model is to minimize the total annual cost $C_{tot}$ of an energy hub system:

$$\min C_{tot} = C_{init}^{HP} + \frac{(1+i)^n - 1}{i(1+i)^n} C_{op} \quad (1)$$

$$C_{init}^{HP} = \varphi_{HP} Q_{HP,max} \quad (2)$$

Where, $C_{init}^{HP}$ is the initial cost of the heat pump, n=10 is the operating years of the energy hub, i is the operation and maintenance growth rate of the energy hub, $C_{op}$ is the annual operation cost and is provided by the lower-layer model, $\varphi_{HP}$ 1218 yuan/kw is the price per unit heat pump capacity, and $Q_{HP,max}$ is the capacity of the heat pump.

The second objective function of the upper-layer model is to minimize the total annual exhaust emission $CO_{2,tot}$ of the energy hub system:

$$\min CO_{2,tot} = CO_{2,e} + CO_{2,f} \quad (3)$$

Where, $CO_{2,e}$ is the exhaust emission of an electrical device, $CO_{2,f}$ is the exhaust emission of a natural gas device, and $CO_{2,tot}$ is provided by the lower-layer model.

The heat pump capacity constraint of the upper-layer model is:

$$0 \leq Q_{HP,max} \leq Q\_max_{HP,max} \quad (4)$$

Where, $Q\_max_{HP,max}$ is the theoretical maximum capacity of the heat pump, i.e., the desirable upper limit when optimizing the capacity of the heat pump, and is provided by the lower-layer model.

Optionally, the step (3) specifically includes that:

In the double-layer optimization, the upper layer mainly optimizes the capacity of the heat pump, and the lower layer mainly optimizes the power of various sets of equipment.

The first objective function of the lower-layer model is to minimize the total annual operation cost $C_{op}$ of the energy hub system:

$$\min C_{op} = C_{op,e} + C_{op,f} \quad (5)$$

$$\min C_{op,e} = \begin{cases} \varphi_{e,night} \sum_{t=1}^{N} P_e(t) \Delta t, & t \in [19, 24) \\ \varphi_{e,day} \sum_{t=1}^{N} P_e(t) \Delta t, & t \in [0, 19) \end{cases} \quad (6)$$

$$C_{op,f} = \varphi_f \sum_{t=1}^{N} P_f(t) \Delta t \quad (7)$$

$$P_e = P_{e,EH} + P_{e,HP} + P_{e,CH} + L_e \quad (8)$$

Where, $C_{op,e}$ is the total annual operation cost of electricity, $C_{op,f}$ is the total annual operation cost of natural gas, $\varphi_f$=0.316 is the price per unit natural gas, $\varphi_{e,night}$=0.4 yuan/kwh is the price per kilowatt-hour in an off-peak period of electricity consumption [19:00 to 24:00), $\varphi_{e,day}$=0.6 yuan/kwh is the price per kilowatt-hour in a peak period of electricity consumption [00:00 to 19:00], $P_f(t)$ is the total power of natural gas equipment at time t, $P_e(t)$ is the total power of electrical equipment at time t, $\Delta$ t=1 is unit time, N=8760 is the total times of a year, $P_e$ is the total electric power, $P_{e,EH}$ is the power of the electric boiler, $P_{e,HP}$ is the power of the heat pump, $P_{e,CH}$ is the power of a refrigerator, and $L_e$=1000 kw is additional electric power of a user.

The second objective function of the lower-layer model is to minimize the total annual exhaust emission $CO_{2,tot}$ of the energy hub system:

$$\min CO_{2,tot} = CO_{2,e} + CO_{2,f} \quad (9)$$

$$CO_{2,e} = \lambda_e \sum_{t=1}^{N} P_e(t) \Delta t \quad (10)$$

$$CO_{2,f} = \lambda_f \sum_{t=1}^{N} P_f(t) \Delta t \quad (11)$$

Where, the $CO_{2,e}$ is the total annual exhaust emission of electricity, $CO_{2,f}$ is the total annual exhaust emission of natural gas, $\lambda_e$=0.02072 kg/kwh is the exhaust emission per unit electric power, and $\lambda_f$=0.17644 kg/kwh is the exhaust emission per unit natural gas.

The load balance constraint of the lower-layer model is:

original constraint st. $\begin{cases} L_h = \eta_{fh}^{B_h} P_f + \eta_{eh}^{EH} P_{e,EH} + \eta_{eh}^{HP} P_{e,HP} & (12) \\ L_c = \eta_{ec}^{CH} P_{e,CH} + (\eta_{ch}^{HP} - 1) P_{e,HP} & (13) \end{cases}$ loose constraint:

st. $\begin{cases} L_h \leq \eta_{fh}^{B_h} P_f + \eta_{eh}^{EH} P_{e,EH} + \eta_{eh}^{HP} P_{e,HP} & (16) \\ L_c \leq \eta_{ec}^{CH} P_{e,CH} + (\eta_{ch}^{HP} - 1) P_{e,HP} & (17) \end{cases}$ CV. $\begin{cases} g_1 = \max(0, 1 - (\eta_{fh}^{B_h} P_{fh} + \eta_{eh}^{EH} P_{e,EH} + \eta_{eh}^{HP} P_{e,HP}) / L_h) & (18) \\ g_2 = \max(0, 1 - (\eta_{ec}^{CH} P_{e,CH} + (\eta_{ch}^{HP} - 1) P_{e,HP}) / L_c) & (19) \end{cases}$ $$L_h = A_h + A_h \sin\left(2\pi \frac{t}{\tau_y} + \frac{\pi}{2}\right) \quad (20)$$

$$L_c = A_c + A_c \sin\left(2\pi \frac{t}{\tau_y} - \frac{\pi}{2}\right) \quad (21)$$

Where, $A_h$=6000 kw is the amplitude of a heating load function, and $A_c$=6000 kw is the amplitude of a cooling load function.

Where, $L_h$ is total heating load, $L_c$ is total cooling load, $\eta_{fh}^B$=0.85 is a heating coefficient of the natural gas boiler, which represents the heating capacity per unit natural gas in the natural gas boiler, $\eta_{eh}^{EH}$=0.95 is a heating coefficient of the electric boiler, which represents the heating capacity per kilowatt-hour electricity in the electric boiler, $\eta_{eh}^{HP}$=6 is a heating coefficient of the heat pump, which represents the heating capacity per kilowatt-hour electricity in the heat pump, and $\eta_{ec}^{CH}=4$ is a refrigerating coefficient of the refrigerator, which represents the refrigerating capacity per kilowatt-hour electricity in the refrigerator.

The energy source equipment operation constraint of the lower-layer model is:

$$\text{st.} \begin{cases} P_{e,CH} \geq 0 & (22) \\ P_{e,HP} \geq 0 & (23) \\ P_{e,EH} \geq 0 & (24) \\ P_f \geq 0 & (25) \end{cases}$$

$$\text{st.} \begin{cases} \eta_{ec}^{CH} P_{e,CH} \leq Q_{CH,max} & (26) \\ (\eta_{eh}^{HP} - 1)P_{e,HP} \leq Q_{HP,max} & (27) \\ \eta_{eh}^{EH} P_{e,EH} \leq Q_{EH,max} & (28) \\ \eta_{fh}^{B} P_f \leq Q_{B,max} & (29) \end{cases}$$

$$\text{loss function: } g_3 = \max(0, 1 - Q_{HP,max}/(\eta_{eh}^{HP} - 1)P_{e,HP}) \quad (30)$$

$$P_{e,HP}(t) \leq \min\left\{\frac{L_c(t)}{\eta_{eh}^{HP} - 1}, \frac{L_h(t)}{\eta_{eh}^{HP}}\right\} \quad (31)$$

Where, $Q_{CH,max} \to \infty$ is the maximum capacity of the refrigerator, $Q_{EH,max}=2000$ is the maximum capacity of the electric boiler, and $Q_{B,max} \neq \infty$ is the maximum capacity of the natural gas boiler. Based on the working principle of the heat pump, the heat pump can heat and refrigerate simultaneously, and the heating capacity is equal to the refrigerating capacity, so in order not to waste energy, the maximum power of the heat pump does not exceed $$\min\left\{\frac{L_c(t)}{\eta_{eh}^{HP} - 1}, \frac{L_h(t)}{\eta_{eh}^{HP}}\right\}.$$

Optionally, the step (4) specifically includes that:

(4-1) The binary search algorithm is a computer algorithm with the time complexity of O(logn). A lower limit and an upper limit of the capacity of the heat pump need to be set according to the idea of the binary search algorithm. It can be known from the formula (27) that the value range of the capacity of the heat pump is

[$l$mid, $r$mid]=[0, $(\eta_{eh}^{HP}-1)P_{e,HP}$].

(4-2) An ending condition of binary search needs to be set according to the idea of a binary algorithm. According to the idea of the multi-objective algorithm, if the length of the value range of the capacity of the heat pump is less than L, then the binary search is ended to enter step (4-7).

(4-3) According to the analysis of a heat pump efficiency graph, large or small heat pump capacity is not beneficial to the operation of the whole energy hub. The heat pump efficiency graph which is a quadratic function with an upward opening is obtained. So, we need to take three values for comparing each time when binary search is performed, respectively:

$$\text{mid}=(l\text{mid}+r\text{mid})/2 \quad (32)$$

$$l\text{mid}=(l\text{mid}+\text{mid})/2 \quad (33)$$

$$r\text{mid}=(\text{mid}+r\text{mid})/2 \quad (34)$$

(4-4) Optimal total annual operation cost $l\text{mid}_{C_{op}}$, $\text{mid}_{C_{op}}$, and $r\text{mid}_{C_{op}}$, and optimal total annual exhaust emission $l\text{mid}_{Co2_{tot}}$, $\text{mid}_{Co2_{tot}}$, and $r\text{mid}_{Co2_{tot}}$ corresponding to the $l$mid, mid, and rmid are obtained from the lower-layer model, and objective function values, total annual cost $C_{tot}$ and total annual exhaust emission $Co2_{tot}$, are calculated by means of objective function formulae (1) and (3), which are respectively:

$$\text{tuple}_{lmid}=(l\text{mid}_{C_{tot}}, l\text{mid}_{Co2_{tot}}) \quad (35)$$

$$\text{tuple}_{mid}=(\text{mid}_{C_{op}}, \text{mid}_{Co2_{tot}}) \quad (36)$$

$$\text{tuple}_{rmid}=(r\text{mid}_{C_{op}}, r\text{mid}_{Co2_{tot}}) \quad (37)$$

(4-5) If $\text{tuple}_{lmid}$ dominates $\text{tuple}_{rmid}$, then the heat pump range is updated to be [$l$mid, mid], and step (4-2) is re-executed. Otherwise, step (4-6) is executed.

(4-6) If $\text{tuple}_{rmid}$ dominates $\text{tuple}_{lmid}$, then the heat pump range is updated to be [$l$mid, mid], and step (4-2) is re-executed. Otherwise, the $\text{tuple}_{rmid}$ and the $\text{tuple}_{lmid}$ do not dominate each other, then step (4-7) is executed.

(4-7) Optimization solutions, $\text{tuple}_{lmid}$, $\text{tuple}_{mid}$, and $\text{tuple}_{rmid}$, are obtained. The optimization solutions are selected and output according to preference.

Optionally, the step (5) specifically includes:

(5-1) Heat pump capacity, $l$mid, mid, and rmid, are obtained from the upper-layer model; the capacity of each heat pump is optimized by operating the lower-layer model, and optimized results are transmitted to the upper-layer model, where t=1 needs to be set every time.

(5-2) Algorithm parameters are set corresponding to time t, and gene coding is performed on decision variables, where the used real number encoding manners respectively include: $P_{e,CH}$, $P_{e,HP}$, $P_{4,EH}$, $P_f$.

(5-3) A population P is initialized.

(5-4) Objective function values, operation cost $C_{op,t}$ and exhaust emission $C_{o2,t}$ at time t are calculated.

(5-5) Crowding distance between individuals in the population P is calculated.

(5-6) Selection operation is performed by using a binary tournament selection method.

Where, in the binary tournament selection method, a tournament selection strategy is that two individuals are taken out from a population (put back for sampling), and then a better one is selected to enter an offspring population. The operation is repeated until a new population scale reaches the original population scale.

(5-7) Crossover operation is performed by using a simulated binary crossover operator (SBX). Step (5-7) specifically includes:

$$x_{1,j}^{t+1} = 0.5 * [(1 + r_j) * x_{1,j}^t + (1 - r_j) * x_{2,j}^t] \quad (38)$$

$$x_{2,j}^{t+1} = 0.5 * [(1 - r_j) * x_{1,j}^t + (1 + r_j) * x_{2,j}^t] \quad (39)$$

$$r_j = \begin{cases} (2u_j)^{\frac{1}{\eta+1}} & \text{if } u_j \leq 0.5 \\ \frac{1}{2(1-u_j)}^{\frac{1}{\eta+1}} & \text{other situations} \end{cases} \quad (40)$$

Where, $u_j \in U(0,1)$, $\eta=1$ is a distribution index.

(5-8) Mutation operation is performed by using a polynomial mutation operator PM. Step (5-8) specifically includes:

$$x_{1,j}^{t+1} = x_{1,j}^t + \Delta_j \quad (41)$$

$$\Delta_j = \begin{cases} (2u_j)^{\frac{1}{\eta+1}} - 1 & \text{if } u_j \leq 0.5 \\ 1 - (2(1-u_j))^{\frac{1}{\eta+1}} & \text{other situations} \end{cases} \quad (42)$$

Where, $u_j \in U(0,1)$, $\eta=1$ is a distribution index.

(5-9) A parent population P and an offspring population Q are merged into a population R; the population R is sorted according to a constraint violation degree and a non-dominant relationship; the former N individuals of the ranked population are selected to enter the next generation for evolution, where N is the size of the population. Step (5-9) specifically includes:

$$CV = g_1 + g_2 + g_3 \quad (43)$$

The constraints (22), (23), (24), (25), (26), (28), and (29) are ensured to be strictly followed during initialization and evolution. Loss functions, $g_1$, $g_2$, and $g_3$, are calculated according to the formulae (18), (19), and (30), and the constraint violation degree is obtained through a formula (43). The individuals with the constraint violation degree of 0 are selected to enter the population P. If the population P is full, then crossover and mutation are started to be selected; otherwise, if the population P is not full, the individuals with low constraint violation degrees are selected. Front individuals in a non-dominated sorting layer are selected when the constraint violation degrees are the same, and the individuals with large crowing distance are selected when non-dominated sorting layers are the same.

(5-10) Whether an algorithm ending condition is satisfied is determined, which specifically includes:

the solutions at the time t are stored when continuous N generations of objective function values are converged to a small interval or reaches the maximum number of evolutionary iterations, including the objective function values and decision variables: $C_{op}(t)$, $CO_2(t)$, $P_{e,EH}(t)$, $P_{e,HP}(t)$, $P_{e,CH}(t)$, $P_f(t)$. Step (5-11) is executed; otherwise, step (5-4) is re-executed.

(5-11) Whether the solutions at k typical times have been solved or not is determined, which specifically includes that:

There are 8760 times in a year, and it can be known from a load function curve that the annual load demands are symmetrical, so the solutions of 4380 times need to be solved. In order to improve the optimization efficiency, the present disclosure only optimizes the solutions of k typical times by using the idea of typical times. If the solutions at k typical times have been solved, step (5-12) is executed, and otherwise, step (5-2) is re-executed.

(5-12) The solutions of non-typical times are approached by using a linear fitting method. Step (5-12) specifically includes that:

There are many linear fitting methods, where a Lagrange interpolation method and a cubic spline curve are commonly used. The present disclosure approaches the solutions of non-typical times by using the Lagrange interpolation method. Lagrange interpolation is performed between every two typical times to obtain the solutions of all non-typical times. Finally, the solutions of the typical times and the non-typical times are merged.

(5-13) Optimal total annual operation cost $C_{op}$ and optimal total annual exhaust emission $CO_{2,tot}$ are calculated.

$$C_{op} = k^* \Sigma C_{op,t} = k^* \Sigma (\varphi_f P_f(t) + \varphi_{e,energy} P_e(t)) \quad (44)$$

is obtained according to the formulae (5), (6), (7), and (8).

$$CO_{2,tot} = k^* \in (\lambda_e P_e(t) + \lambda_f P_f(t)) \quad (45)$$

$$P_e(t) = (P_{e,EH}(t) + P_{e,HP}(t) + P_{e,CH}(t) + L_e) \quad (46)$$

are obtained according to the formulae (9), (10), and (11).

(5-14) Annual operation plans, optimal total annual operation cost, $lmid_{C_{op}}$, $mid_{C_{op}}$, $rmid_{C_{op}}$, and optimal total annual exhaust emission $lmid_{Co2_{tot}}$, $mid_{Co2_{tot}}$, and $rmid_{Co2_{tot}}$ of various sets of energy source equipment in the energy hub corresponding to lmid, mid, and rmid can be obtained according to the statistics of the power information and $C_{op}$, $CO_{2,tot}$ of various sets of energy source equipment of all times. The information is transmitted to the upper-layer model as parameters for subsequent optimization.

Optionally, step (6) specifically includes:

The integrating double layers of optimization models is to transmit the solutions optimized by the lower-layer model to the upper-layer model, and parameters need to be obtained from the lower-layer model continually when the upper-layer model is optimized. The optimal solutions obtained after the optimization of the upper-layer model is ended are the optimal solutions of problems.

The present disclosure discloses an optimization method for capacity of a heat pump and various power of various sets of energy source equipment in an energy hub, which can solve the problem of multi-objective double-layer model without the help of commercial optimization software. A reasonable, efficient, and green planning solution is obtained, so that the total operation cost and the total exhaust emission of the energy hub reach optimal relatively.

In this specification, specific examples are used to describe the principle and implementation manners of the present disclosure. The description of the embodiments above is merely intended to help understand the method and core idea of the present disclosure. In addition, those skilled in the art may make modifications based on the idea of the present disclosure with respect to the specific implementation manners and the application scope. In conclusion, the content of the present description shall not be construed as a limitation to the present disclosure. Any other modifications, ornaments, replacements, combinations, and simplifications made under the ideas and principles of the present disclosure should be equivalent replacements, and should be included within the scope of protection of the present disclosure.

What is claimed is:

1. An optimization method for capacity of a heat pump and power of various sets of energy source equipment in an energy hub, comprising:
    (1) establishing an energy hub model containing a natural gas boiler, an electric boiler, a cooler, and a heat pump;
    (2) establishing an upper-layer model of double-layer optimization to solve optimal capacity of the heat pump;
    (3) establishing a lower-layer model of double-layer optimization to solve optimal power of the various sets of energy source equipment;
    (4) solving the upper-layer model by using a quadratic function-based binary search algorithm;
    (5) solving a lower-layer model by using a Non-dominated Sorting Genetic Algorithm-II (NSGA-II) of a multi-objective evolutionary algorithm;

(6) integrating double layers of optimization models to obtain an optimal solution; and (7) adjusting capacity of the heat pump and power of the heat pump, the natural gas boiler, the electric boiler and the cooler based on the optimal solution.

2. The optimization method for capacity of a heat pump and power of various sets of energy source equipment in an energy hub according to claim 1, wherein the energy source equipment comprises a natural gas boiler, an electric boiler, a cooler, and a heat pump.

3. The optimization method for capacity of a heat pump and power of various sets of energy source equipment in an energy hub according to claim 1, wherein the step (1) specifically comprises:

establishing an energy source supply network according to energy supply equipment in the energy hub, wherein the input of the energy hub comprises electric energy and natural gas; and the input of the energy hub comprises heating load, cooling load, and additional electrical load.

4. The optimization method for capacity of a heat pump and power of various sets of energy source equipment in an energy hub according to claim 1, wherein the step (6) specifically comprises that:

the integrating double layers of optimization models is to transmit the solutions optimized by the lower-layer model to the upper-layer model, and parameters need to be obtained from the lower-layer model continually when the upper-layer model is optimized; the optimal solutions obtained after the optimization of the upper-layer model is ended are the optimal solutions of problems.

5. The optimization method for capacity of a heat pump and power of various sets of energy source equipment in an energy hub according to claim 1, wherein the step (2) specifically comprises that:

in the energy hub, the power of various sets of equipment can be optimized only after the capacity of the various sets of equipment is set, which is a problem about master-slave optimization; the double layers of optimization models are commonly used models for solving the master-slave optimization problem;

the first objective function of the upper-layer model is to minimize the total annual cost $C_{tot}$ of an energy hub system:

$$\min C_{tot} = C_{init}^{HP} + \frac{(1+i)^n - 1}{i(1+i)^n} C_{op} \quad (1)$$

$$C_{init}^{HP} = \varphi_{HP} Q_{HP,max} \quad (2)$$

wherein, $C_{init}^{HP}$ is the initial cost of the heat pump, n is the operating years of the energy hub, i is the operation and maintenance growth rate of the energy hub, $C_{op}$ is the annual operation cost and is provided by the lower-layer model, $\varphi_{HP}$ is the price per unit heat pump capacity, and $Q_{HP,max}$ is the capacity of the heat pump;

the second objective function of the upper-layer model is to minimize the total annual exhaust emission $CO_{2,tot}$ of the energy hub system:

$$\min CO_{2,tot} = CO_{2,e} + CO_{2,f} \quad (3)$$

wherein, $CO_{2,e}$ is the exhaust emission of an electrical device, $CO_{2,f}$ is the exhaust emission of a natural gas device, and $CO_{2,tot}$ is provided by the lower-layer model;

the heat pump capacity constraint of the upper-layer model is:

$$Q \leq Q_{HP,max} \leq Q\_max_{HP,max} \quad (4)$$

where, $Q\_max_{HP,max}$ is the theoretical maximum capacity of the heat pump, that is, the desirable upper limit when optimizing the capacity of the heat pump, and is provided by the lower-layer model.

6. The optimization method for capacity of a heat pump and power of various sets of energy source equipment in an energy hub according to claim 5, wherein the step (3) specifically comprises that:

in the double-layer optimization, the upper layer mainly optimizes the capacity of the heat pump, and the lower layer mainly optimizes the power of various sets of equipment;

the first objective function of the lower-layer model is to minimize the total annual operation cost $C_{op}$ of the energy hub system:

$$\min C_{op} = C_{op,e} + C_{op,f} \quad (5)$$

$$\min C_{op,e} = \begin{cases} \varphi_{e,night} \sum_{t=1}^{N} P_e(t) \Delta t, & t \in [19, 24) \\ \varphi_{e,day} \sum_{t=1}^{N} P_e(t) \Delta t, & t \in [0, 19) \end{cases} \quad (6)$$

$$C_{op,f} = \varphi_f \sum_{t=1}^{N} P_f(t) \Delta t \quad (7)$$

$$P_e = P_{e,EH} + P_{e,HP} + P_{e,CH} + L_e \quad (8)$$

wherein, $C_{op,e}$ is the total annual operation cost of electricity, $C_{op,f}$ is the total annual operation cost of natural gas, $\varphi_f$ is the price per unit natural gas, $\varphi_{e,night}$ is the price per kilowatt-hour in an off-peak period of electricity consumption [19:00 to 24:00], $\varphi_{e,day}$ is the price per kilowatt-hour in a peak period of electricity consumption [00:00 to 19:00], $P_f(t)$ is the total power of natural gas equipment at time t, $P_e(t)$ is the total power of electrical equipment at time t, $\Delta t=1$ is unit time, N=8760 is the total times of a year, $P_e$ is the total electric power, $P_{e,EH}$ is the power of the electric boiler, $P_{e,HP}$ is the power of the heat pump, $P_{e,CH}$ is the power of a refrigerator, and $L_e$ is additional electric power of a user;

the second objective function of the lower-layer model is to minimize the total annual exhaust emission $CO_{2,tot}$ of the energy hub system:

$$\min CO_{2,tot} = CO_{2,e} + CO_{2,f} \quad (9)$$

$$CO_{2,e} = \lambda_e \sum_{t=1}^{N} P_e(t) \Delta t \quad (10)$$

$$CO_{2,f} = \lambda_f \sum_{t=1}^{N} P_f(t) \Delta t \quad (11)$$

wherein, the $CO_{2,e}$ is the total annual exhaust emission of electricity, $CO_{2,f}$ is the total annual exhaust emission of natural gas, $\lambda_e$, is the exhaust emission per unit electric power, and $\lambda_f$ is the exhaust emission per unit natural gas;

the load balance constraint of the lower-layer model is:

$$\text{original constraint st.} \begin{cases} L_h = \eta_{fh}^{B_h} P_f + \eta_{eh}^{EH} P_{e,EH} + \eta_{eh}^{HP} P_{e,HP} & (12) \\ L_c = \eta_{ec}^{CH} P_{e,CH} + (\eta_{ch}^{HP} - 1) P_{e,HP} & (13) \end{cases}$$

$$\text{loose constraint: st.} \begin{cases} L_h \leq \eta_{fh}^{B_h} P_f + \eta_{eh}^{EH} P_{e,EH} + \eta_{eh}^{HP} P_{e,HP} & (16) \\ L_c \leq \eta_{ec}^{CH} P_{e,CH} + (\eta_{ch}^{HP} - 1) P_{e,HP} & (17) \end{cases}$$

$$CV. \begin{cases} g_1 = \max(0, 1 - (\eta_{fh}^{B_h} P_f + \eta_{eh}^{EH} P_{e,EH} + \eta_{eh}^{HP} P_{e,HP})/L_h) & (18) \\ g_2 = \max(0, 1 - (\eta_{ec}^{CH} P_{e,CH} + (\eta_{ch}^{HP} - 1) P_{e,HP})/L_c) & (19) \end{cases}$$

$$\begin{cases} L_h = A_h + A_h \sin\left(2\pi \frac{t}{\tau_y} + \frac{\pi}{2}\right) & (20) \\ L_c = A_c + A_c \sin\left(2\pi \frac{t}{\tau_y} - \frac{\pi}{2}\right) & (21) \end{cases}$$

wherein, $A_h$ is the amplitude of a heating load function, and $A_c$ is the amplitude of a cooling load function;

wherein, $L_h$ is total heating load, $L_c$ is total cooling load, $\eta_{fh}^B$ is a heating coefficient of the natural gas boiler, which represents the heating capacity per unit natural gas in the natural gas boiler, $\eta_{eh}^{EH}$ is a heating coefficient of the electric boiler, which represents the heating capacity per kilowatt-hour electricity in the electric boiler, $\eta_{eh}^{HP}$ is a heating coefficient of the heat pump, which represents the heating capacity per kilowatt-hour electricity in the heat pump, and $\eta_{ec}^{CH}$ is a refrigerating coefficient of the refrigerator, which represents the refrigerating capacity per kilowatt-hour electricity in the refrigerator;

the energy source equipment operation constraint of the lower-layer model is:

$$\text{st.} \begin{cases} P_{e,CH} \geq 0 & (22) \\ P_{e,HP} \geq 0 & (23) \\ P_{e,EH} \geq 0 & (24) \\ P_f \geq 0 & (25) \end{cases}$$

$$\text{st.} \begin{cases} \eta_{ec}^{CH} P_{e,CH} \leq Q_{CH,max} & (26) \\ (\eta_{eh}^{HP} - 1) P_{e,HP} \leq Q_{HP,max} & (27) \\ \eta_{eh}^{EH} P_{e,EH} \leq Q_{EH,max} & (28) \\ \eta_{fh}^B P_f \leq Q_{B,max} & (29) \end{cases}$$

$$\text{loss function: } g_3 = \max(0, 1 - Q_{HP,max}/(\eta_{eh}^{HP} - 1) P_{e,HP}) \quad (30)$$

$$P_{e,HP}(t) \leq \min\left\{\frac{L_c(t)}{\eta_{eh}^{HP} - 1}, \frac{L_h(t)}{\eta_{eh}^{HP}}\right\} \quad (31)$$

wherein, $P_f$ is the total power of natural gas equipment $Q_{CH,max} \to \infty$ is the maximum capacity of the refrigerator, $Q_{EH,max}=2000$ is the maximum capacity of the electric boiler, and $Q_{B,max} \to \infty$ is the maximum capacity of the natural gas boiler; based on the working principle of the heat pump, the heat pump can heat and refrigerate simultaneously, and the heating capacity is equal to the refrigerating capacity, so in order not to waste energy, the maximum power of the heat pump does not exceed $\min\left\{\frac{L_c(t)}{\eta_{eh}^{HP} - 1}, \frac{L_h(t)}{\eta_{eh}^{HP}}\right\}$.

7. The optimization method for capacity of a heat pump and power of various sets of energy source equipment in an energy hub according to claim 6, wherein the step (4) specifically comprises that:

(4-1) the binary search algorithm is a computer algorithm with a time complexity of O(logn); a lower limit and an upper limit of the capacity of the heat pump need to be set according to the idea of the binary search algorithm; it can be known from the formula (27) that the value range of the capacity of the heat pump is [lmid, rmid]=[0, $(\eta_{eh}^{HP}-1)P_{e,HP}$];

(4-2) an ending condition of binary search needs to be set according to the idea of a binary algorithm; according to the idea of the multi-objective algorithm, if the length of the value range of the capacity of the heat pump is less than L, then the binary search is ended to enter step (4-7);

(4-3) according to the analysis of a heat pump efficiency graph, large or small heat pump capacity is not beneficial to the operation of the whole energy hub; the heat pump efficiency graph which is a quadratic function with an upward opening is obtained; so, we need to take three values for comparing each time when binary search is performed, respectively:

$$\text{mid}=(l\text{mid}+r\text{mid})/2 \quad (32)$$

$$l\text{mid}=(l\text{mid}+\text{mid})/2 \quad (33)$$

$$r\text{mid}=(\text{mid}+r\text{mid})/2 \quad (34)$$

(4-4) optimal total annual operation cost $l\text{mid}_{C_{op}}$, $\text{mid}_{C_{op}}$, and $r\text{mid}_{C_{op}}$ and optimal total annual exhaust emission $l\text{mid}_{Co2_{tot}}$, $\text{mid}_{Co2_{tot}}$, and $r\text{mid}_{Co_{tot}}$ corresponding to the lmid, mid, and rmid are obtained from the lower-layer model, and objective function values, total annual cost $C_{tot}$ and total annual exhaust emission $Co2_{tot}$, are calculated using objective function formulae (1) and (3), which are respectively:

$$\text{tuple}_{lmid}=(l\text{mid}_{C_{tot}}, l\text{mid}_{Co2_{tot}}) \quad (35)$$

$$\text{tuple}_{mid}=(\text{mid}_{C_{op}}, \text{mid}_{Co2_{tot}}) \quad (36)$$

$$\text{tuple}_{rmid}=(r\text{mid}_{C_{op}}, r\text{mid}_{Co2_{tot}}) \quad (37)$$

(4-5) if $\text{tuple}_{lmid}$ dominates $\text{tuple}_{rmid}$, then the heat pump range is updated to be [lmid, mid], and step (4-2) is re-executed; otherwise, step (4-6) is executed;

(4-6) if $\text{tuple}_{rmid}$ dominates $\text{tuple}_{lmid}$, then the heat pump range is updated to be [mid, rmid], and step (4-2) is re-executed; otherwise, the $\text{tuple}_{rmid}$ and the $\text{tuple}_{lmid}$ do not dominate each other, then step (4-7) is executed; and (4-7) optimization solutions, $\text{tuple}_{lmid}$, $\text{tuple}_{mid}$, and $\text{tuple}_{rmid}$, are obtained; and one of the optimization solutions is selected and output according to preference.

8. The optimization method for capacity of a heat pump and power of various sets of energy source equipment in an energy hub according to claim 7, wherein the step (5) specifically comprises:

(5-1) obtaining heat pump capacity, lmid, mid, and rmid, from the upper-layer model; optimizing the capacity of each heat pump by operating the lower-layer model, and transmitting optimized results to the upper-layer model, wherein t=1 needs to be set every time;

(5-2) setting algorithm parameters corresponding to time t, and performing gene coding on decision variables, wherein the used real number encoding manners respectively comprise: $P_{e,CH}$, $P_{e,HP}$, $P_{e,EH}$, $P_f$;

(5-3) initializing a population P;

(5-4) calculating objective function values, operation cost $C_{op,t}$ and exhaust emission $CO_{2,t}$ at time t;

(5-5) calculating crowding distance between individuals in the population P;

(5-6) performing selection operation by using a binary tournament selection method, wherein, in the binary tournament selection method, a tournament selection strategy is that two individuals are taken out from a population (put back for sampling), and then a better one is selected to enter an offspring population; the operation is repeated until a new population scale reaches the original population scale;

(5-7) performing crossover operation by using a simulated binary crossover operator (SBX); step (5-7) specifically includes:

$$x_{1,j}^{t+1} = 0.5 * [(1 + r_j) * x_{1,j}^t + (1 - r_j) * x_{2,j}^t] \quad (38)$$

$$x_{2,j}^{t+1} = 0.5 * [(1 - r_j) * x_{1,j}^t + (1 + r_j) * x_{2,j}^t] \quad (39)$$

$$r_j = \begin{cases} (2u_j)^{\frac{1}{\eta+1}} & \text{if } u_j \leq 0.5 \\ \frac{1}{2(1-u_j)}^{\frac{1}{\eta+1}} & \text{other situations} \end{cases} \quad (40)$$

wherein, $u_j \in U(0,1)$, $\eta=1$ is a distribution index;

(5-8) performing mutation operation by using a polynomial mutation operator PM; step (5-8) specifically comprises:

$$x_{1,j}^{t+1} = x_{1,j}^t + \Delta_j \quad (41)$$

$$\Delta_j = \begin{cases} (2u_j)^{\frac{1}{\eta+1}} - 1 & \text{if } u_j \leq 0.5 \\ 1 - (2(1-u_j))^{\frac{1}{\eta+1}} & \text{other situations} \end{cases} \quad (42)$$

wherein, $u_j \in U(0,1)$, $\eta=1$ is a distribution index;

(5-9) merging a parent population P and an offspring population Q into a population R; sorting the population R according to a constraint violation degree and a non-dominant relationship; selecting the former N individuals of the ranked population to enter the next generation for evolution, wherein N is the size of the population; step (5-9) specifically includes:

$$CV = g_1 + g_2 + g_3 \quad (43)$$

the constraints (22), (23), (24), (25), (26), (28), and (29) are ensured to be strictly followed during initialization and evolution; loss functions, $g_1$, $g_2$, and $g_3$, are calculated according to the formulae (18), (19), and (30), and the constraint violation degree is obtained through a formula (43); the individuals with the constraint violation degree of 0 are selected to enter the population P; if the population P is full, then crossover and mutation are started to be selected; otherwise, if the population P is not full, the individuals with low constraint violation degrees are selected; front individuals in a non-dominated sorting layer are selected when the constraint violation degrees are the same, and the individuals with large crowing distance are selected when non-dominated sorting layers are the same;

(5-10) determining whether an algorithm ending condition is satisfied, which specifically includes:

storing the solutions at the time t when continuous $N$ generations of objective function values are converged to a small interval or reaches the maximum number of evolutionary iterations, including the objective function values and decision variables:

$C_{op}(t)$, $CO_2(t)$, $P_{e,EH}(t)$; $P_{e,HP}(t)$; $P_{e,CH}(t)$; $P_f(t)$; executing step (5-11);

otherwise, re-executing step (5-4);

(5-11) determining whether the solutions at k typical times have been solved or not, which specifically includes that:

there are 8760 times in a year, and it can be known from a load function curve that the annual load demands are symmetrical, so the solutions of 4380 times need to be solved; in order to improve the optimization efficiency, the present disclosure only optimizes the solutions of k typical times by using the idea of typical times; if the solutions at k typical times have been solved, step (5-12) is executed, and otherwise, step (5-2) is re-executed;

(5-12) approaching the solutions of non-typical times by using a linear fitting method; step (5-12) specifically comprises that:

there are many linear fitting methods, wherein a Lagrange interpolation method and a cubic spline curve are commonly used; the present disclosure approaches the solutions of non-typical times by using the Lagrange interpolation method; Lagrange interpolation is performed between every two typical times to obtain the solutions of all non-typical times; finally, the solutions of the typical times and the non-typical times are merged;

(5-13) calculating optimal total annual operation cost $C_{op}$ and optimal total annual exhaust emission $CO_{2,tot}$, wherein $$C_{op} = k * \Sigma C_{op,t} = k * \Sigma(\varphi_f P_f(t) + \varphi_{e,energy} P_e(t)) \quad (44)$$

is obtained according to the formulae (5), (6), (7), and (8);

$$CO_{2,tot} = k * \Sigma(\lambda_e P_e(t) + \lambda_f P_f(t)) \quad (45)$$

$$P_e(t) = (P_{e,EH}(t) + P_{e,HP}(t) + P_{e,CH}(t) + L_e) \quad (46)$$

are obtained according to the formulae (9), (10), and (11); and (5-14) obtaining annual operation plans, optimal total annual operation cost, $lmid_{C_{op}}$, $mid_{C_{op}}$, $rmid_{C_{op}}$, and optimal total annual exhaust emission $lmid_{Co2_{tot}}$, $mid_{Co2_{tot}}$, and $rmid_{Co2_{tot}}$ of various sets of energy source equipment in the energy hub corresponding to lmid, mid, and rmid according to the statistics of the power information, and $C_{op}$ and $CO_{2,tot}$ of various sets of energy source equipment of all times, and transmitting the information the upper-layer model as parameters for subsequent optimization.

9. The optimization method for capacity of a heat pump and power of various sets of energy source equipment in an energy hub according to claim 8, wherein the step (7) comprises:

adjusting capacity of the heat pump according to a capacity of the heat pump corresponding to the selected optimization solution; and adjusting power of the heat pump, the natural gas boiler, the electric boiler and the cooler according to a statistics of power information of the heat pump, the natural gas boiler, the electric boiler and the cooler at all times corresponding to the selected optimization solution, respectively.

* * * * *